Nov. 30, 1965 D. W. QUIRK 3,221,318
VISUAL INDICATOR FOR HEAT CONTROLLER
Filed Dec. 8, 1961

INVENTOR.
DOUGLAS W. QUIRK
BY
Marvin M. Chaban
ATTORNEY

United States Patent Office 3,221,318
Patented Nov. 30, 1965

3,221,318
VISUAL INDICATOR FOR HEAT CONTROLLER
Douglas W. Quirk, Deerfield, Ill., assignor to General
Electric Company, a corporation of New York
Filed Dec. 8, 1961, Ser. No. 158,066
4 Claims. (Cl. 340—222)

The present invention relates to indicators and more particularly to visual indicators for determining the preset condition of a heat controller having a plurality of sequential outputs.

The invention is designed for use most particularly with heating unit controllers wherein the control device may be adjusted to any one of a plurality of positions, each supplying a distinct wattage input to a heating unit or combination of heating units. A familiar example of such a device is disclosed in U.S. Patent 2,747,073, issued to S. B. Welch on May 22, 1956. The present invention applies equally to infinite heat controllers of the type shown in U.S. Patent 2,906,845, issued on September 29, 1959, to C. R. Turner, wherein a control knob may be rotated to any one of an infinite number of positions, each of the positions in one direction of rotation of the knob sequentially providing additional incremental wattage inputs to the heating unit and consequent heat outputs therefrom.

It is customary to furnish a pilot lamp with these controls, the pilot lamp simply indicating the presence or absence of a closed circuit by whether it is illuminated. Such lamp indications merely remind the user whether the heat is turned on or off and give no indication of the heat intensity setting of the unit. Needless to say, it is a common occurrence for the user of an electric range to set the heat to a desired output level, then to become occupied with other tasks and to return to the range having forgotten the original setting. The user must then peer at the indicia on the knob at the particular setting to determine just where it had been set.

It is therefore an object of the invention to provide a readily visible indicator for use in conjunction with a controller having a series of settings each representing a specific thermal output condition, where the indicator will continuously produce a visible indication to the user of the condition set at the controller.

It is a further object of the invention to provide an indicator responsive to the amount of angular displacement of a rotary controller from a predetermined position, whereby said indicator assumes one of a plurality of visually discernible conditions indicative of the amount of said displacement.

It is a further object of the invention to provide a visual indication lamp which responds to the angular displacement of a rotary heat controller knob by pulsating at a frequency which corresponds to the amount of displacement; the frequency of lamp pulsations increasing as the angular displacement of the knob increases toward the maximum setting, thereby providing a visually discernible indication of the amount of rotary displacement of the controller.

It is a still further object of the invention to provide a visual signal device for a heat control system of the type wherein the wattage input to the heating source may be varied by a manual controller; and in which the signal device is governed by a firing circuit which varies the frequency of pulsations to said device consonant with the wattage input settings at said controller.

To effectuate these and other objects, the present invention contemplates a signalling device in which the frequency of cycling of a neon lamp indicates the wattage setting of a heat controller. In a controller in which manual adjustment is accomplished by means of a rotatable knob, a firing circuit for the lamp may include a rheostat responsive to the rotational displacement of the knob to vary the resistance of a resistance-capacitance network. In a controller having a plurality of pushbutton actuated switches, as disclosed in Andrews U.S. Patent 2,431,904, granted December 2, 1947, fixed resistances of appropriate value may be associated with the several pushbutton-established circuits. The network includes a capacitor of fixed parameter whereby the output frequency of the network is dependent on the amount of resistance retained in the circuit. The network is used in combination with a neon lamp to provide oscillations, the frequency of which may be varied to vary the pulsating output frequency of the neon lamp. The lamp oscillating frequency may vary over a range from a slow pulsating condition which may be on the order of a pulsation each second to a fast pulsating condition on the order of twenty per second. By this variability of setting, the lamp pulsating frequency will correspond to the wattage set at the controller, and will range from relatively slow pulsation at low wattage settings to relatively fast pulsation at high wattage settings. In summary, the lamp firing circuit utilizes the changes in the time constant of a resistance-capacitance network corresponding to changes in wattage input settings to vary the pulsating frequency of a neon lamp and as a result to indicate the heat output settings of a heating source.

The invention both as to its organization and principle of operation, together with further objects, features and advantages thereof will best be understood by reference to the following specification taken in connection with the accompanying drawings in which.

It should be noted that the present invention is shown herein as applied to an infinite heat controller of the type shown in the cited Turner patent for governing the operation of a surface unit. It can readily be understood that the invention is equally applicable to surface unit controllers having a finite plurality of sequential positions ranging from high to low and also to oven controllers of either the infinite heat type or the plural position (finite) type.

Figure 1:
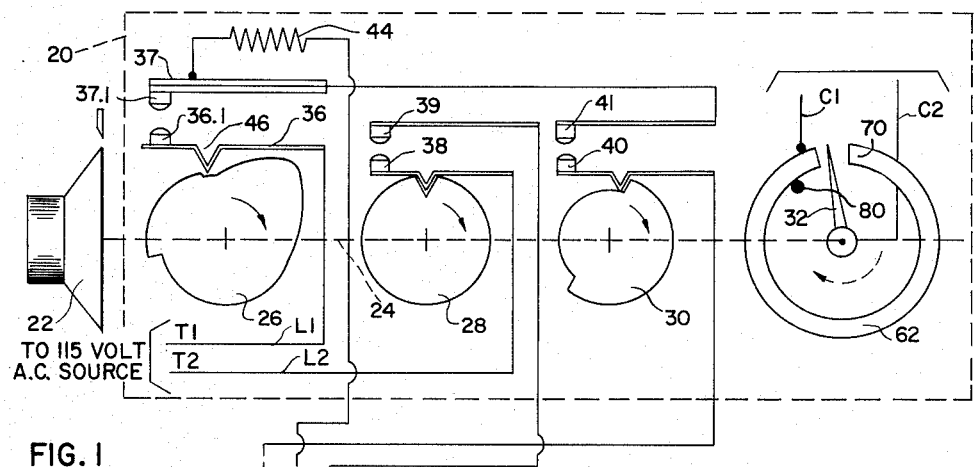
FIG. 1 is a partially schematic plan view of a surface heating unit and the manually actuatable rotary knob controller therefor.

Now turning to FIG. 1 there is shown a surface heating unit 10 of the two-coil type which includes an outer coil 12 and an inner coil 14. Each of these coils is of the generally known sheathed type comprising a helical resistance conductor housed in a metallic sheath and supported in uniformly spaced relationship to the sheath by a highly compacted mass of suitable heat conducting and electrically insulating material such as powdered magnesium oxide. Conventionally, such surface heating coils are arranged to form several flat spirals which are nested within one another to form the surface heating unit shown exemplarily numbered 10.

To provide a desired range of heat outputs from heating unit 10, there is provided the control mechanism 20 which in most instances would be mounted adjacent the unit in a manner allowing ready access to control knob 22. In the conventional construction, the control mechanism would be mounted behind a suitable housing wall with a shaft 24 extending rotatably through the housing for mounting thereon control knob 22. The control knob is physically secured to the end of cam shaft 24 and the knob on manual rotation will establish the rotation of the shaft and will consequently control the angular displacement of a plurality of cams numbered respectively 26, 28, 30, and rheostat slider arm 32. Cams 26, 28 and 30 each have a contoured cam surface, which is individually designed to control an individual pair of leaf-spring contacts. Thus, cam 26 has a cam-actuated leaf-spring contact 36 which opens or closes a circuit to a stationary contact 37, the operation which will be described more in detail. Cam 28 controls an armature leaf spring 38 which may open or close a circuit to a stationary contact 39; and cam 30 actuates its leaf-spring contact 40 from an open position with respect to contact 41 to a closed circuit position. Slider arm 32 of the rheostat varies the resistance retained in the circuit from conductor C1 to conductor C2 on the change in position of slider 32 following rotation of the control knob.

In the controller of the type shown in FIG. 1, leaf spring 37 is of bi-metallic construction with a small capacity heater 44 physically mounted in good heat transfer relation therewith. Following closure of the circuit to heater 44, heat is transmitted by the heater to the bi-metal. After a time period the bi-metal deflects in a generally known fashion to open its own circuit at contacts 36.1 and 37.1. The bi-metal cools, recloses and then reheats. This cycling continues at a ratio determined by the pressure exerted by the cam face on the spring in the manner set out in the Turner patent. Contact spring 36 may be considered as normally open with respect to bi-metal spring 37; this normal condition occurring while the inwardly directed segments of cam 26 are adjacent the formed V-shaped actuator deflection 46 in spring 36. The normal condition of the control mechanism occurs only when knob 22 is in its Off position. The particular contour of cam 26 has been selected to provide contact pressures of spring 36 against spring 37 on closure which must be overcome by the bi-metal flexure on heating to open the circuit. By setting this contact pressure, the ratio of contact closed time to contact open time may be changed to thereby change the resulting input to the heating unit. Parenthetically, it should be noted that in many prior art patents, this cycling ratio may be varied by setting the operating characteristics of a motor to effect the variable pre-settable wattage inputs to a heating unit.

With a controller of the type shown in FIG. 1, for low settings of knob 22 only the inner heating coil 14 is energized, and for high settings of knob 22 both the inner and the outer heating coils 14 and 12 are energized. To provide further variability and to control the wattage inputs more completely, the cycling effect of bi-metal contact spring 37 is utilized. The closure of bi-metal spring 37 to cam-actuated spring 36 is directly in the energization path to both inner and outer heat coils and thereby governs the action of both these heating coils. These paths can be traced from lead L1 through the respective contact leaf springs 36 and 37 to the parallel energizing path for each heat coil. The path to inner coil 14 may be traced from contact spring 37 through heater 44 to coil 14 and the common return junction 50. The outer coil energizing path may be traced through bi-metal spring 37 to leaf-spring contacts 41 and 40, and heat coil 12 to common junction 50 from which the commoned lead path may be followed through contact 39 and cam-actuated contact spring 38 to lead L2.

The other contoured cams used include: cam 28 which closes its armature contact 38 to stationary contact 39 at all rotational positions except in the Off position. With contact 38 closed to contact 39, a circuit is prepared to both heat coils 12 and 14 through the common junction 50. Cam 30 keeps its contacts open for low settings by virtue of its inwardly sloped cam face and closes contact spring 40 to contact spring 41 for all high settings. With contact spring 40 closed to contact 41, a circuit is prepared to outer coil 12; and with these contact springs open, the circuit to outer coil 12 remains open.

Figure 2:
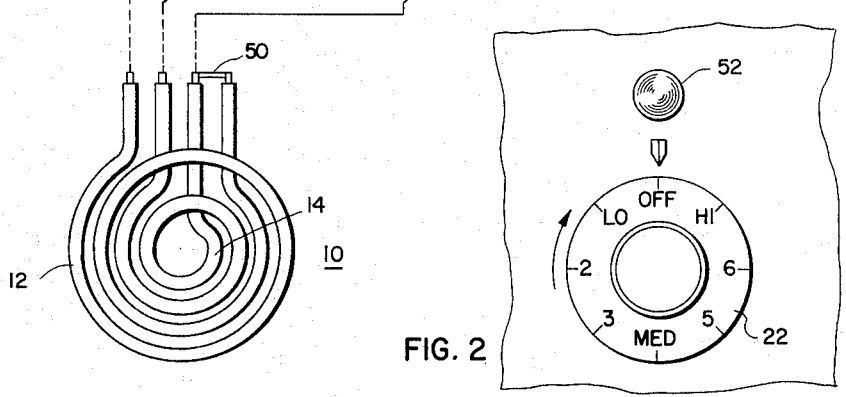
FIG. 2 is a partial front view of the manual control knob of FIG. 1 and the neon lamp associated therewith.

In FIG. 2 there is shown a representative control knob 22, which in the instance shown is designed to be manually rotated in a clockwise direction from an Off position through an infinite plurality of positions from the Low position to the High position through the other numbered intermediate positions. Directly above and associated with knob 22 is a glow discharge tube in the form of a neon lamp 52 of a conventional type which operates on 115 volts and which will glow when knob 22 is displaced from the normal or Off position by the circuit of FIG. 3. In the normal cooking top construction with a plurality of heating units, each unit has its own individual control knob and indicator lamp.

Figure 3:
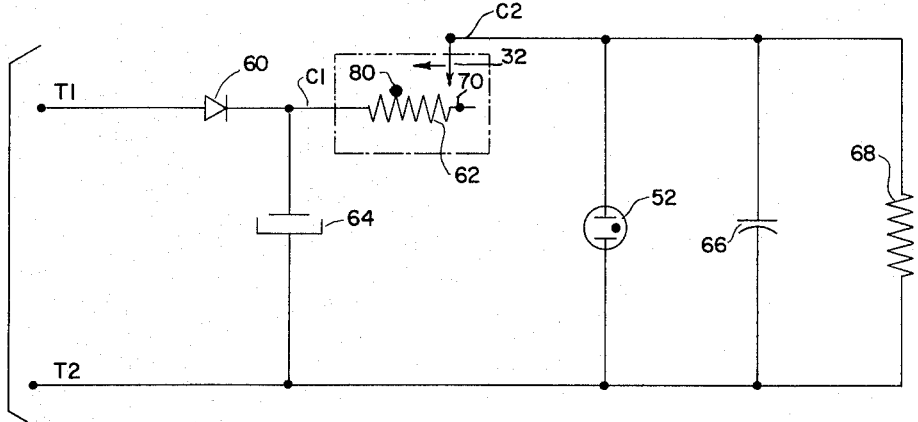
FIG. 3 is a schematic circuit diagram of the lamp control and firing circuit employing my invention.

Now referring to the circuit of FIG. 3, there is shown the electrical control circuit for the controller previously described, which is connected at suitable terminals T1 and T2 to a source of conventional 115-volt, 60-cycle alternating current.

The firing circuit of FIG. 3 includes a conventional diode rectifier 60 connected to one input lead from the alternating current source. The rectifier is used to rectify the source current and provide half-wave, pulsating direct current to the firing circuit. To smooth out the pulsations of the direct current, a capacitor 64, preferably an electrolytic capacitor, is connected across the source leads within the direct current circuit. This capacitor in a generally known manner acts as a capacitor input filter. The direct current circuit to which the filtered direct current is fed through lead C1, includes a simple relaxation oscillator. The oscillator is formed of a variable frequency R.-C. network and a neon glow lamp 52. The oscillator components include a variable resistor 62 in series relation to the diode 60 and a capacitor 66 in parallel to the neon lamp 52; the parallel combination of lamp 52 and capacitor 66 is serially connected at one end through conductor C2 to the slider 32 of variable resistor 62 and at the other end to the other side of the line at terminal T2. A final resistor 68 is used in parallel to the neon glow lamp 52 to suppress transient voltages in a known manner.

With the circuitry just described, there is provided a rectified, direct current relaxation oscillator with a variable resistance and variable time constant. By varying the network resistance, the oscillation output frequency may be varied accordingly, and consequently neon lamp 52 will be pulsed at the circuit output frequency. Thus at a low output frequency, lamp 52 will pulse or flicker at a slow rate; at a high output frequency, the lamp will pulse or flicker at a fast rate.

To perform the desired functions within the circuit set out, the following parameters have been found to operate satisfactorily and are presented exemplarily:

| | |
|---|---|
| Neon Lamp 52 | 100-volt breakdown; 80-volt shut-off. |
| Resistor 62 | Variable from .5 megohms to 8 megohms. |
| Capacitor 64 | 50 mf. (electrolytic capacitor). |
| Capacitor 66 | .5 mf. |
| Resistor 68 | 15 megohms. |

Rheostat are variable resistor 62 includes the rotary cam or slider 32 which is rotated on rotation of shaft 24 from an OFF position in which there is an open circuit condition between the cam 32 and the end 70 of the resistance 62. As the knob 22 is displaced angularly from the Off position, cam 32 travels along the resistor from a level of 8 megohms at one end (70) to a stop 80 at the other end at which .5 megohm of resistance are retained in the resistance-capacitance network.

From the parameters and construction shown, it can be seen that with the knob 22 in the Off position, cam 32 is in open circuit condition with respect to resistance 62 hence, neon lamp 52 cannot fire. As the knob is rotated to the very first position adjacent terminal 70, cam 32 contacts the resistor at the extreme end 70 of the resistance, providing 8 megohms of resistance. With capacitance of .5 mf. produced by capacitor 66, the time duration during which the circuit builds up to the 100-volt firing level of lamp 52 is a time equal to $R \times C$. With resistance of 8 megohms and capacitance of .5 mf., the time constant of the network at this setting is 4 seconds for the first firing. It should be noted that the lamp firing point is at approximately 63% of peak (100 volts lamp firing, 165 volts peak), which is the percentage of peak used in calculating the standard time constant curves; therefore, direct R-C multiplication furnishes the standard time constant for the first lamp firing. However, once the lamp has fired, it shunts out the capacitor and the capacitor-induced voltage drops rapidly to the lamp extinguishing level which nominally may be 20 volts below the firing point or approximately one-fifth of the total firing voltage. Once the lamp is extinguished, the capacitor again begins charging from the lamp extinguishing level (80 volts), and its voltage increases toward the lamp firing level. Since the voltage increase to firing is only one fifth of the total required on starting, the next and all subsequent refirings of the lamp occur in about one-fifth (0.2) of the total build-up time or approximately .8 second. (It is admitted that the calculation utilizing the multiplication factor of 0.2 for continuous firing is an oversimplified approximation; but the principle employed if used consistently throughout, it is felt, will minimize the relative error.) Therefore, once the lamp is firing and extinguishing at its relaxation level it will be firing at roughly the rate of 1.25 cycles per second, which corresponds to a relatively low frequency of flicker as observed visually. When knob 22 is set at the opposite extreme position labelled "High," cam 32 is in contact with stop terminal 80, and .5 megohm only are retained in the R-C network. At this position, the time for the first firing is (.5 megohm $\times$ .5 mf.) .25 second. Subsequent firings will occur in about one-fifth of that time, .05 second, corresponding to a rate of 20 pulses per second, which corresponds to a relatively high frequency of flicker as observed visually.

Now turning to the operation of the heat control system of FIG. 1, the knob 22 is rotated to the particular degree of heat required. Thus for low heat, the knob is displaced angularly to any position up to 90° from the Off position. Rotation of the knob naturally displaces the cams 26, 28, 30, and slider 32, a like amount. Due to the shape of cam 26, a 90° displacement of the knob provides a great amount of contact pressure on bi-metal spring 37 to maintain it closed a large proportion of the time. Contact spring 38 is closed to its stationary counterpart spring 39 completing a circuit through common junction 50 to the inner coil 14 and contact closures at springs 36 and 37. Contact 40 is not actuated at this time and as a result, the outer coil 12 is not energized. Thus, at this setting of 90° displacement, only the inner coil is energized but it is energized intermittently by the closure bi-metal spring 37 to spring 36 a large percentage of the time to keep the inner coil energized almost continuously. At this position, cam 32 is approximately one-fourth of the distance from terminal 70 to terminal 80 with about 6.1 megohms of resistance in the R-C network. At this position, the period of firing of the lamp would be (6.1 megohms $\times$ .5 mf. $\times$ .2, the multiplication factor for recurrent firing) .61 second, corresponding to a rate of 1.6 pulses per second. The lamp will then pulsate at this rate indicating to the user a medium to low heat or wattage input.

When knob 22 is rotated to the medium position, cams 26, 28 and 30 are all closed completing the energizing circuits to both inner heat coil 14, outer heat coil 12 and the bi-metal heater 44. A comparatively small amount of pressure is generated by cam 26 on the bi-metal to allow the heating coil circuits to be open a moderate amount of time providing an average of a medium wattage input. The indicator at this time will be pulsating at a higher rate with about 4.25 megohms of resistance feeding the relaxation oscillator. The period of firing of the lamp will be equal to 4.25 megohms $\times$ .5 mf. $\times$ 0.2 or .425 second, corresponding to a rate of 2.4 pulses per second.

At the full heat setting of knob 22, both heat coils 12 and 14 are energized and a maximum amount of pressure is exerted on the bi-metal spring to maintain a maximum wattage input with the bi-metal contact closed a maximum allowable amount of the time. As previously mentioned, this position will cause lamp 52 to flicker at about 20 pulses per second as the result of .5 megohm being connected in the R-C circuit.

The operation of the circuit has been explained for only a few of the possible positions setting out the terminal conditions and the principle used in these computations. It can readily be seen that by interpolation any intermediate positions or knob settings produce particular pulsing speeds of an infinite degree between the stated limits.

While there has been described what is at present thought to be a preferred embodiment of the invention, it will be understood that various modifications may be made therein and it is my intention to cover in the appended claims all such modifications which fall within the true spirit and scope of the invention.

What is claimed is:

1. In an electric heating system including an electric heating unit, and a source of electric power; the combination comprising an oscillator operative at a frequency within a given range, a manually operable controller having an off position and a variable range of on positions, means responsive to operation of said controller into its off position for disconnecting said source from both said heating unit and said oscillator and responsive to operation of said controller into its variable range of on positions for connecting said source to both said heating unit and said oscillator, whereby operation of said oscillator is initiated when said source is connected thereto and operation of said oscillator is arrested when said source is disconnected therefrom, means responsive to operation of said controller in one direction in its variable range of on positions for correspondingly increasing both the power supplied to said heating unit and the operating frequency of said oscillator within said given range, and, means responsive to operation of said controller in the opposite direction in its variable range of on positions for correspondingly decreasing both the power supplied to said heating unit and the operating frequency of said oscillator; said oscillator comprising a glow discharge tube, and means for firing said glow discharge tube at a rate matching the operating frequency of said oscillator, said given range of operating frequencies of said oscillator corresponding to firing rates of said glow discharge tube that are disposed in the visible frequency band, said glow discharge tube being operatively associated with said controller to constitute a visual signal for indicating the position thereof, whereby arresting of firing of said glow discharge tube is indicative of the off position of said controller and the firing rate of said glow discharge tube is indicative of the corresponding position of said controller in its variable range of on positions.

2. The electric heating system combination set forth in claim 1, wherein said given range of operating frequencies of said oscillator embraces the frequencies extending from 1 cycle per second to 20 cycles per second.

3. The electric heating system combination set forth in claim 1, wherein said glow discharge tube consists of a neon glow lamp.

4. In an electric heating system including an electric heating unit, and a source of electric power; the combination comprising a relaxation oscillator including a capacitor and a charging circuit for said capacitor and a discharging circuit for said capacitor, said charging circuit including a variable resistor and said source, said discharging circuit including a glow discharge tube, a manually operable controller having an off position and a variable range of on positions, first means responsive to operation of said controller into its off position for disconnecting said source from said heating unit and responsive to operation of said controller into its variable range of on positions for connecting said source to said heating unit, and second means responsive to operation of said controller into its off position for interrupting said charging circuit and responsive to operation of said controller into its variable range of on positions for completing said charging circuit, whereby operation of said oscillator is initiated when said charging circuit is completed and operation of said oscillator is arrested when said charging circuit is interrupted, said first means also being responsive to operation of said controller in one direction in its variable range of on positions for correspondingly increasing the power supplied to said heating unit and responsive to operation of said controller in the opposite direction in its variable range of on positions for correspondingly decreasing the power supplied to said heating unit, said second means also being responsive to operation of said controller in said one direction in its variable range of on positions for correspondingly decreasing the resistance of said variable resistor and responsive to operation of said controller in said opposite direction in its variable range of on positions for correspondingly increasing the resistance of said variable resistor, said oscillator being operative at a frequency within a given range as established by the resistance of said variable resistor, the operating frequency of said oscillator being increased as the resistance of said variable resistor is decreased and the operating frequency of said oscillator being decreased as the resistance of said variable resistor is increased, said glow discharge tube being fired each time the voltage across said capacitor rises to the breakdown voltage of said glow discharge tube so that the firing rate of said glow discharge tube matches the operating frequency of said oscillator and said given range of operating frequencies of said oscillator corresponding to firing rates of said glow discharge tube that are disposed in the visible frequency band, said glow discharge tube being operatively associated with said controller to constitute a visual signal for indicating the position thereof, whereby arresting of firing of said glow discharge tube is indicative of the off position of said controller and the firing rate of said glow discharge tube is indicative of the corresponding position of said controller in its variable range of on positions.

References Cited by the Examiner

UNITED STATES PATENTS

| | | | |
|---|---|---|---|
| 2,431,904 | 12/1947 | Andrews | 200—5 |
| 2,526,234 | 10/1950 | Huck | 340—222 |
| 2,647,252 | 7/1953 | Moore | 340—222 |
| 2,747,073 | 5/1956 | Welch et al. | 219—398 |
| 2,804,531 | 8/1957 | Dadson | 219—452 |
| 2,906,845 | 9/1959 | Turner | 219—485 |
| 3,022,498 | 2/1962 | Alcott | 340—253 |

NEIL C. READ, *Primary Examiner.*